US008250154B2

(12) United States Patent
Limberg (10) Patent No.: US 8,250,154 B2
(45) Date of Patent: Aug. 21, 2012

(54) STRUCTURED ARCHIVING AND RETRIEVAL OF LINKED MESSAGES IN A SYNCHRONOUS COLLABORATIVE ENVIRONMENT

(75) Inventor: Jared Andrew Limberg, Shaker Heights, OH (US)

(73) Assignee: International Business Machines Corporation, Armonk, NY (US)

( * ) Notice: Subject to any disclaimer, the term of this patent is extended or adjusted under 35 U.S.C. 154(b) by 1524 days.

(21) Appl. No.: 11/737,411

(22) Filed: Apr. 19, 2007

(65) Prior Publication Data

US 2008/0144784 A1 Jun. 19, 2008

Related U.S. Application Data

(63) Continuation-in-part of application No. 11/611,667, filed on Dec. 15, 2006, now abandoned.

(51) Int. Cl.
*G06F 15/16* (2006.01)
*G06F 17/00* (2006.01)
*H04M 1/725* (2006.01)

(52) U.S. Cl. ........ 709/206; 709/219; 715/206; 715/207; 455/412.1

(58) Field of Classification Search .................. 709/206, 709/207, 219; 455/466, 412.1; 715/206–208
See application file for complete search history.

(56) References Cited

U.S. PATENT DOCUMENTS

| | | | |
|---|---|---|---|
| 6,557,027 B1 | 4/2003 | Cragun | |
| 6,792,448 B1 | 9/2004 | Smith | |
| 7,089,278 B1* | 8/2006 | Churchill et al. | 709/203 |
| 7,479,949 B2* | 1/2009 | Jobs et al. | 345/173 |
| 7,933,957 B2* | 4/2011 | Daniell | 709/206 |
| 2003/0023683 A1* | 1/2003 | Brown et al. | 709/204 |
| 2003/0167310 A1* | 9/2003 | Moody et al. | 709/206 |
| 2004/0078435 A1* | 4/2004 | Dunbar et al. | 709/206 |
| 2007/0022213 A1* | 1/2007 | Fahmy et al. | 709/246 |
| 2007/0033250 A1* | 2/2007 | Levin et al. | 709/204 |
| 2007/0174408 A1* | 7/2007 | Paul et al. | 709/207 |
| 2007/0180040 A1* | 8/2007 | Etgen et al. | 709/207 |
| 2007/0271340 A1* | 11/2007 | Goodman et al. | 709/206 |
| 2008/0028027 A1* | 1/2008 | Jachner | 709/206 |
| 2008/0153459 A1* | 6/2008 | Kansal et al. | 455/412.1 |
| 2009/0138828 A1* | 5/2009 | Schultz et al. | 715/853 |
| 2010/0076974 A1* | 3/2010 | Takahashi et al. | 707/736 |
| 2010/0087172 A1* | 4/2010 | Klassen et al. | 455/412.1 |
| 2010/0159944 A1* | 6/2010 | Pascal et al. | 455/456.1 |
| 2010/0179991 A1* | 7/2010 | Lorch et al. | 709/206 |
| 2010/0191820 A1* | 7/2010 | Daniell et al. | 709/206 |
| 2010/0217808 A1* | 8/2010 | Benninger | 709/206 |
| 2011/0153761 A1* | 6/2011 | Anderson | 709/206 |
| 2011/0185288 A1* | 7/2011 | Gupta et al. | 715/752 |

FOREIGN PATENT DOCUMENTS

EP 1669884 A1 * 6/2006

OTHER PUBLICATIONS

Myers, Jasmine, Non-final Office Action dated Aug. 28, 2009.

* cited by examiner

*Primary Examiner* — Lisa Hashem
(74) *Attorney, Agent, or Firm* — Yudell Isidore Ng Russell, PLLC (57) ABSTRACT

A method, system, and computer program product enables manipulation of a message thread created by linking two or more messages within a messaging interface of a synchronous, collaborative messaging application. The message thread is first generated by linking the plurality of messages within the messaging interface. Then manipulation of the message thread is enabled in a separate window from the messaging interface.

29 Claims, 9 Drawing Sheets

STRUCTURED ARCHIVING AND RETRIEVAL OF LINKED MESSAGES IN A SYNCHRONOUS COLLABORATIVE ENVIRONMENT

PRIORITY CLAIM

The present application is a continuation-in-part of U.S. patent application Ser. No. 11/611,667 "Method for Contextual Indicators in a Synchronous Collaborative Environment" filed on Dec. 15, 2006 now abandoned.

BACKGROUND OF THE INVENTION

1. Technical Field

The present invention generally relates to electronic communication, and in particular to the use of synchronous messaging applications. Still more particularly, the present invention relates to a method and system for enhancing the utilization of synchronous messaging applications.

2. Description of the Related Art

Instant messaging has become one of the more popular (and non-intrusive) means of communication at home, in office, on vacation, or wherever a computer is available with software necessary for instant messaging. Fast growing web activity has lead to expanded utilization of synchronous collaborative environments for virtual classrooms, corporate collaboration, and multi-user networking. Multi-user messaging applications allow various communities to experience noninvasive communication for an unlimited time, from their location of choice, and in their preferred environment.

Synchronous collaborative environments, or multi-user instant messaging applications are frequently utilized in corporate, educational, and recreational communication. Existing synchronous collaborative applications, such as IBM Community Tools®, IBM/Lotus Sametime Connect®, AOL Instant Messenger®, Yahoo! Chat®, MSN Messenger®, and Google®, bridge communication gaps daily. Each messaging system provides a messenger interface and means for a user to send and receive messages via a messaging server. While the method of sending and receiving messages has proven to effective, users are frequently faced with disadvantages.

Inconveniences associated with current messaging applications yield a number of other problems. Multi-user instant messaging applications do not provide support for indicating a single message's context in response to another user's message. Messages are simply ordered sequentially, and each message is displayed when retrieved/forwarded from the server. In synchronous collaborative environments, users may submit questions, answers, or comments in response to a preceding or out of sequence message. Many tools have a lag time as a result of application speed, network speed, or user response time. During this lag time, other users may submit or send another message, completely out of context relative to another user's previous message. The next response, in sequence may appear to be in response to the last message, when the next response may actually be in response to other previously-received messages, such as the next to last message, and/or in response to a message originating from a different user.

Local users in an instant messaging community may send messages intended for a particular remote user, or send sequential messages before receiving a reply from the intended remote user. While communicating through instant messaging, local and remote users are unable to optimally utilize messaging applications because messaging applications do not provide any means to connect a user's response to another user's related message when multiple messages are received prior to the user generating the response (i.e., the response is generated out of sequence relative to the message to which the response is directed).

Thus, an instant messaging user may send (or receive) multiple messages prior to sending (or receiving) a response from the remote user. Messages sent (or received) out of context may result in miscommunication between the users. Users are forced to spend valuable time sorting out the miscommunication, which may not be apparent and thus lead to incorrect information being accepted as a response. Receiving a correct answer/response is very often of great value, whether in the corporate, educational, or recreational setting. For example, a simple "Yes" answer following two or three questions received in succession could apply to any one of the three questions, which may originate from multiple users in a collaborative environment. The wrong user may assume the answer to his question to be "Yes" when the correct answer is on fact "No". Currently, instant messaging applications do not support means to provide an indicator to which a message can be related. This miscommunication may result in real problems, especially in a situation when such communication is not simply casual, inconsequential exchanges. Additionally, the users may spend valuable time repeating a question following an out-of-sequence answer.

SUMMARY OF THE INVENTION

Disclosed is a method, system and computer program product for enabling manipulation of a message thread created by linking two or more messages within a messaging interface of a synchronous, collaborative messaging application. The message thread is first generated by linking the plurality of messages within the messaging interface. Then manipulation of the message thread is enabled in a separate window from the messaging interface.

In one embodiment, the plurality of messages within the message thread is a sub-portion of the total messages within the messaging interface. Also, the link among the plurality of messages is not necessarily sequential or chronological. When the message thread is selected/highlighted, the message thread may be saved as a file, perhaps in response to selection of a save option. When the file is later opened, the file is opened within a window that enables manipulation of the message thread. Manipulation of the message thread may include one of several functions, such as: re-arranging a link sequence of the individual messages within the message thread; sorting the individual messages within the message thread; changing a filename of the file in which the message thread is stored; deleting one or more of the individual messages within the message thread; editing/modifying one or more of the individual messages within the message thread; and annotating the message thread with additional information.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer program product for enabling manipulation of a message thread created by linking two or more messages within a messaging interface of a synchronous, collaborative messaging application. The message thread is first generated by linking the plurality of messages within the messaging interface. Then manipulation of the message thread is enabled in a separate window from the messaging interface.

In one embodiment, the plurality of messages within the message thread is a sub-portion of the total messages within the messaging interface. Also, the link among the plurality of messages is not necessarily sequential or chronological. When the message thread is selected/highlighted, the message thread may be saved as a file, perhaps in response to selection of a save option. When the file is later opened, the file is opened within a window that enables manipulation of the message thread. Manipulation of the message thread may include one of several functions, such as: re-arranging a link sequence of the individual messages within the message thread; sorting the individual messages within the message thread; changing a filename of the file in which the message thread is stored; deleting one or more of the individual messages within the message thread; editing/modifying one or more of the individual messages within the message thread; and annotating the message thread with additional information.

The described embodiments provide an enhancement to a method for adding contextually based indicators to messages within an electronic messaging environment, such as an instant messaging environment or a synchronous collaborative environment. A messaging application is enhanced with the addition of message linking indicators within the messaging client interface. Local and remote users send and receive messages via the messaging client interface. When a local user responds to a message from a remote user, the local user may choose a linking indicator to identify the message or user to which the response is directed. The user may choose to utilize or modify an existing indicator, or create an indicator to link messages. The indicator can be color-coding, line connectors, or any other identifier that would show a connection between two or more messages from one or more users in a manner that is discernable to the users. The indicator can be added before, during, or after message submission. In one embodiment, the indicator may also be removed.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional) on the invention.

It is also understood that the use of specific parameter names are for example only and not meant to imply any limitations on the invention. The invention may thus be implemented with different nomenclature/terminology utilized to describe the above parameters, without limitation. In the following description the term "user" and "client" will be utilized interchangeably to refer to the application interface, user device, and the user interacting with the interface (on the device) to provide certain contextual linkage between messages.

Many multi-user instant messaging applications exist on the Internet or World Wide Web (WWW). Synchronous collaborative environments are widely utilized on the Internet. The World Wide Web is a graphic, interactive interface for the Internet (the term Internet is utilized interchangeably with Web throughout this specification). There are different computer program applications on a data processing system connected to the Web that are utilized to access servers connected to the Web. Many synchronous collaborative applications are accessible via a home web page. Each web page has a unique address, or Uniform Resource Locator (URL) with the Web that is accessible via Transmission Control Protocol/Internet Protocol (TCP/IP) transactions through telecommunication networks. The address allows a web browser to connect to and communicate with a Hyper Text Transfer Protocol (http) server over the Web. Upon accessing the URL and messaging service, the local user may send messages to and receive messages from a remote user. The messages are displayed by the messaging application at the user interface. A messaging server facilitates sending and receiving functions of the messaging application.

Figure 1:
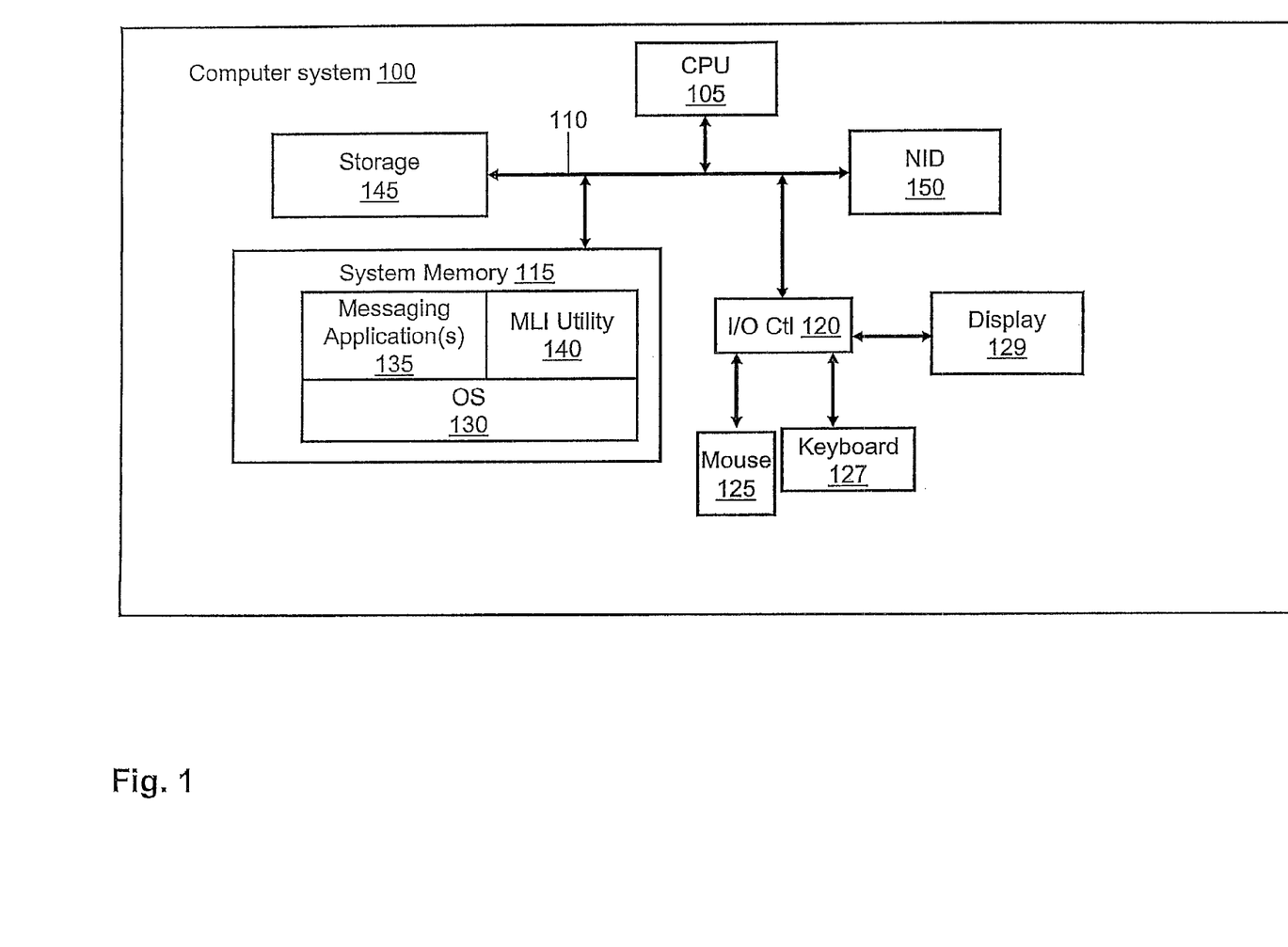
FIG. 1 is a diagram of an example data processing system utilized to implement an illustrative embodiment of the present invention.

Referring now to FIG. 1, there is depicted a block diagram representation of a data processing system (or user device) within which features of the invention may be advantageously implemented. Data processing system (DPS) 100 comprises a central processing unit (CPU) 105 coupled to system memory 115 and other storage 145 via system bus/interconnect 110. Also coupled to system bus 110 is an input/output controller (I/O Controller) 120, which controls access by several input devices, of which mouse 125 and keyboard 127 are illustrated. I/O Controller 120 also controls access to output devices, of which display 129 is illustrated. In order to support use of removable storage media, I/O Controller 120 may further support one or more USB ports, and/or hardware drives, such as an optical disk drive (compact disk Read/Write (CDRW)/digital video disk (DVD) drive), floppy drive, or other I/O peripheral devices (not specifically shown).

DPS 100 further comprises network interface device (NID) 150 by which DPS 100 is able to connect to and communicate with an external device or network (such as the Internet). NID 150 may be a modem or network adapter and may also be a wireless transceiver device.

Those of ordinary skill in the art will appreciate that the hardware depicted in FIG. 1 may vary, and that other devices/hardware may be used in addition to or in place of the hardware depicted. Thus, the depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX®) operating system or LINUX® operating system.

Various features of the invention are provided as software code stored within system memory 115 or other storage 145 and executed by CPU 105. Among the software code are code for providing application server functionality, code for enabling network connection and communication via NID 150, and more specific to the invention, code for enabling the message linking indicator features described below. For simplicity, the collective body of code that enables the message linking indicator features is referred to herein as MLI utility.

Thus, as shown by FIG. 1, in addition to the above described hardware components, data processing system 100 further comprises a number of software components, including operating system (OS) 130 (e.g., Microsoft Windows®, a trademark of Microsoft Corp, or GNU®/Linux®, registered trademarks of the Free Software Foundation and The Linux Mark Institute) and one or more software applications, including synchronous messaging application 135 and MLI utility 140. In implementation, messaging application 135 and MLI utility 140 are located within system memory 115 and executed on CPU 105. In actual implementation, MLI utility 140 may be added to existing messaging application code to provide the message linking indicator functionality within the messaging application.

According to the illustrative embodiment, when CPU 105 executes messaging application 135 along with (or including) MLI utility 140, messaging application 135 and MLI utility 140 enables data processing system 100 to complete a series of functional processes, including: (A) Link messages within the messaging interface utilizing indicators; (B) Create, modify, and delete linking indicators; and (C) Send and receive linked messages in a synchronous collaborative environment; and other features/functionality described below and illustrated by FIGS. 2-6.

In one embodiment, the invention provides an enhancement to various synchronous collaborative environments. Multiple users supply real-time responses in a number of synchronous collaborative environments. Messaging hubs, chat rooms, weblogs (blogs), virtual classrooms, or other synchronous collaborative communities of interest all provide real-time communication and networking on the Web. A message linking indicator application may be activated wherever a user is capable of sending and receiving dynamic messages. The message-linking indicator may be accessible on the messaging interface, provided in an indicator palette or in an indicator toolbar of an existing instant messaging application.

In one embodiment, MLI utility 140 modifies an existing messaging application. The modified messaging application exhibits additional buttons, which control contextual linking functions. The existing messaging application may be modified through updates downloaded from the Web or via applications installed from a computer readable medium or other storage device. The MLI utility may be a component embedded in a newly developed synchronous collaborative environment application. In an alternate embodiment, the MLI utility is part of a complete (stand-alone) messaging application.

The implementation of the present invention may occur on the data processing system described above. It is understood however, that other types of data processing systems are possible, which may have some or more of the basic components described above. In one embodiment, portable data processing systems, such as laptops, PDAs/palmtops, cell phones, blackberries, smart phones, and the like, are utilized during message exchange, as will be described below. Thus, description of or reference to DPS 100 herein refers to any user device that may execute the utility required to complete the functions of the invention.

Figure 2:
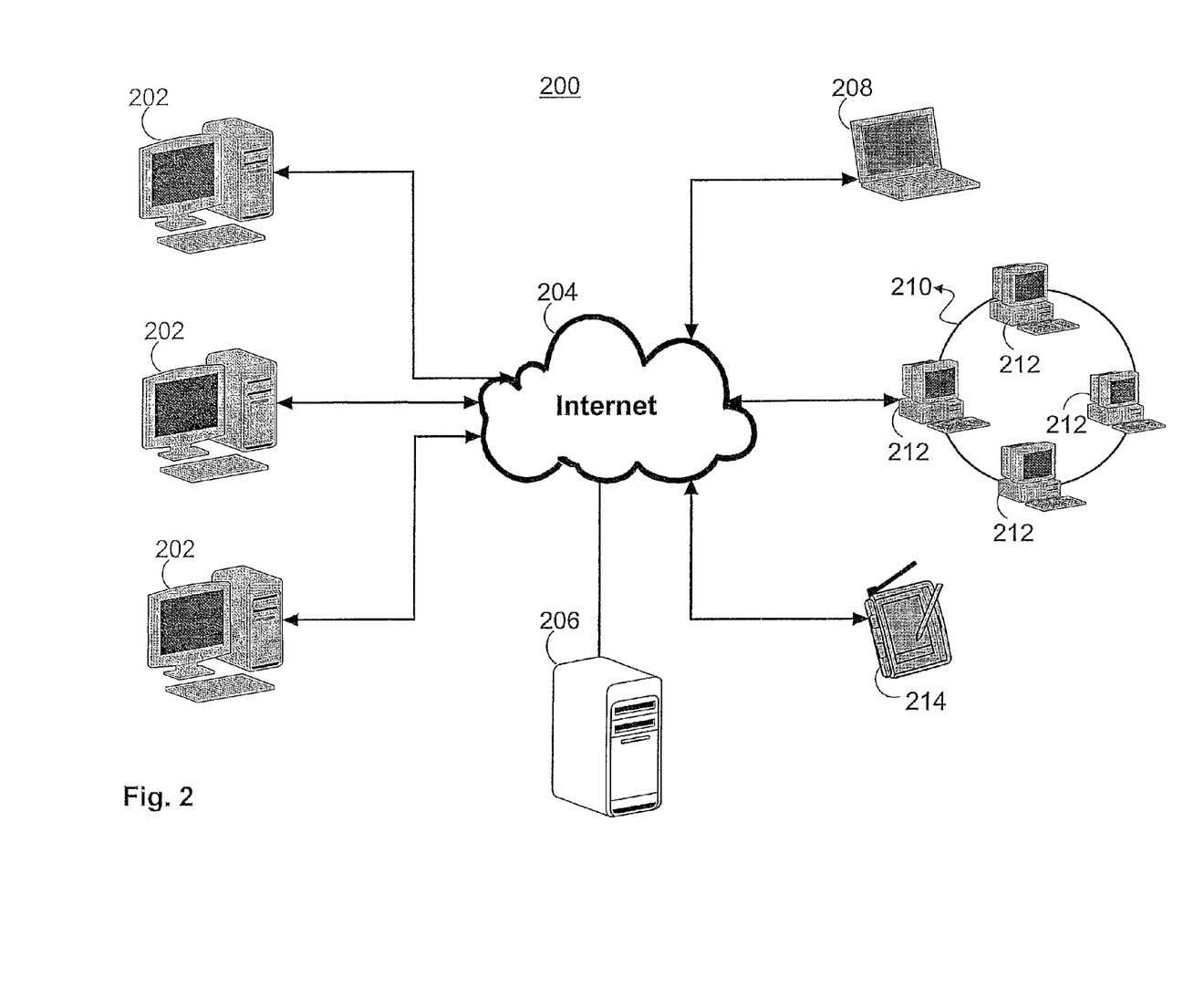
FIG. 2 is a diagram of a network of computers, including an Internet-linked messaging server in accordance with an illustrative embodiment of the present invention.

A. Linking Messages in Synchronous Collaborative Environments Utilizing Indicators In the embodiment in which MLI utility 140 is added to existing messaging application software, once installed, MLI utility 140 modifies current "instant messaging applications" or other "synchronous collaborative environments" (both terms utilized interchangeably herein). This modification involves adding or associating message linking indicator functions or buttons (collectively referred to herein as "affordances") to/with the messaging interface. The original messaging application continues to provide/enable message delivery and retrieval and displays the messages within the message display portion of the interface. MLI utility 140 provides means to add a contextually based indicator to a message before, during, or after the message is submitted to the recipient(s). An example computer network within which the current embodiment may be implemented is illustrated in FIG. 2.

Network 200 comprises messaging server 206 serving client computers, which include desktops 202, portable laptop 208, portable handheld (palmtop) computer 214, and interlinked computer network 210. These various computers represent a non-exhaustive list of user devices on which messaging applications enhanced with MLI utility 140 may be provided. Client computers (202, 208, and 212) may be similarly configured as data processing system 100. Interlinked computer network 210 is located in areas of high utilization and comprises multiple local client computers 212. Messaging server 206 is connected to Internet 204, and operates as the message distributor. In one embodiment, messaging server 206 functions as a memory storage location for MLI utility 140. Internet 204 allows messaging server 206 to provide a Web page or exchange point for a synchronous collaborative community.

Those skilled in the art are familiar with interlinked network computers. Server 206 and client network 210 are located in areas of high utilization. Companies with high usage of synchronous collaborative environments contain local client computers 212. Local client computers 212 are interlinked and connect to Internet 204 and main networked server 206 through a single point.

A client accesses the multi-user messaging interface via client computers 202, 208, 212, and 214. In one embodiment the local client connects to a single remote client via messaging server 206. Messages are sent and received through the messaging server 206. Each message is displayed at the messaging interface of each client in order of receipt. Linked messages appear in the message interface display box of each client. Various indicators are utilized to link messages, as described hereafter. Thus, when a set of messages is linked at the local client, the messages along with the link are shown on each client computer participating in the messaging session. In one embodiment, the linking indicators, which appear both on the local and remote users display, may be different. That is, each user of a particular client may choose how the visual linking cues are displayed on the particular client. A user preference on the local client thus overrides a preference of the user who created the link.

Those skilled in the art are familiar with synchronous collaborative communities (e.g. messaging hubs, virtual classrooms, etc.), which may involve interlinked computer network 210. In one embodiment, messaging applications are installed on each computer in computer network 210 and modified with MLI utility 140. MLI utility 140 allows a local user to link a response to one or more clients in computer network 210.

In another embodiment, MLI utility 140 is embedded in a new synchronous collaborative application or stand-alone messaging application, different from currently available synchronous collaborative or messaging applications. The complete messaging application may then be installed on client computers (202, 208, 212, 214). The complete messaging application may also be accessible via the Web on messaging server 206, for example. The complete messaging application installed on the client devices provides access to messaging network server 206, and displays message-linking indicators as provided by MLI utility 140 within the standard messaging interface.

MLI utility 140 provides means to add a contextually based indicator to a message within the message display of the messaging interface. MLI utility is executed on a user device that is connected to a network of other devices (via the Internet, for example) that support electronic messaging, and include a messaging interface for sending and receiving messages. The interface includes various menus and buttons that activate common messaging task such as font selection, symbol insertion, or attracting the attention of another user. In addition to the basic functions of provided by the messaging application, MLI utility 140 provides a library of message linking indicators, and the user may choose to utilize the provided indicators, modify an existing indicator, or create an indicator. Each of the message linking indicators discussed above can be added before, during, or after message submission utilizing multiple operations, and removed using similar, but reversed methods, as described hereafter.

B. Utilizing, Creating, Modifying, and Removing Linking Indicators

Message-linking indicators are contextual identifiers utilized to associate and thus identify a response (second message) with a particular, previously received/created message or client (or user), while two or more users/clients are communicating in a synchronous collaborative environment. Message linking indicators can be color-coded links, line connectors, italicized text, bold text, or any other identifier that will link two or more messages from one or more users.

Figure 3:
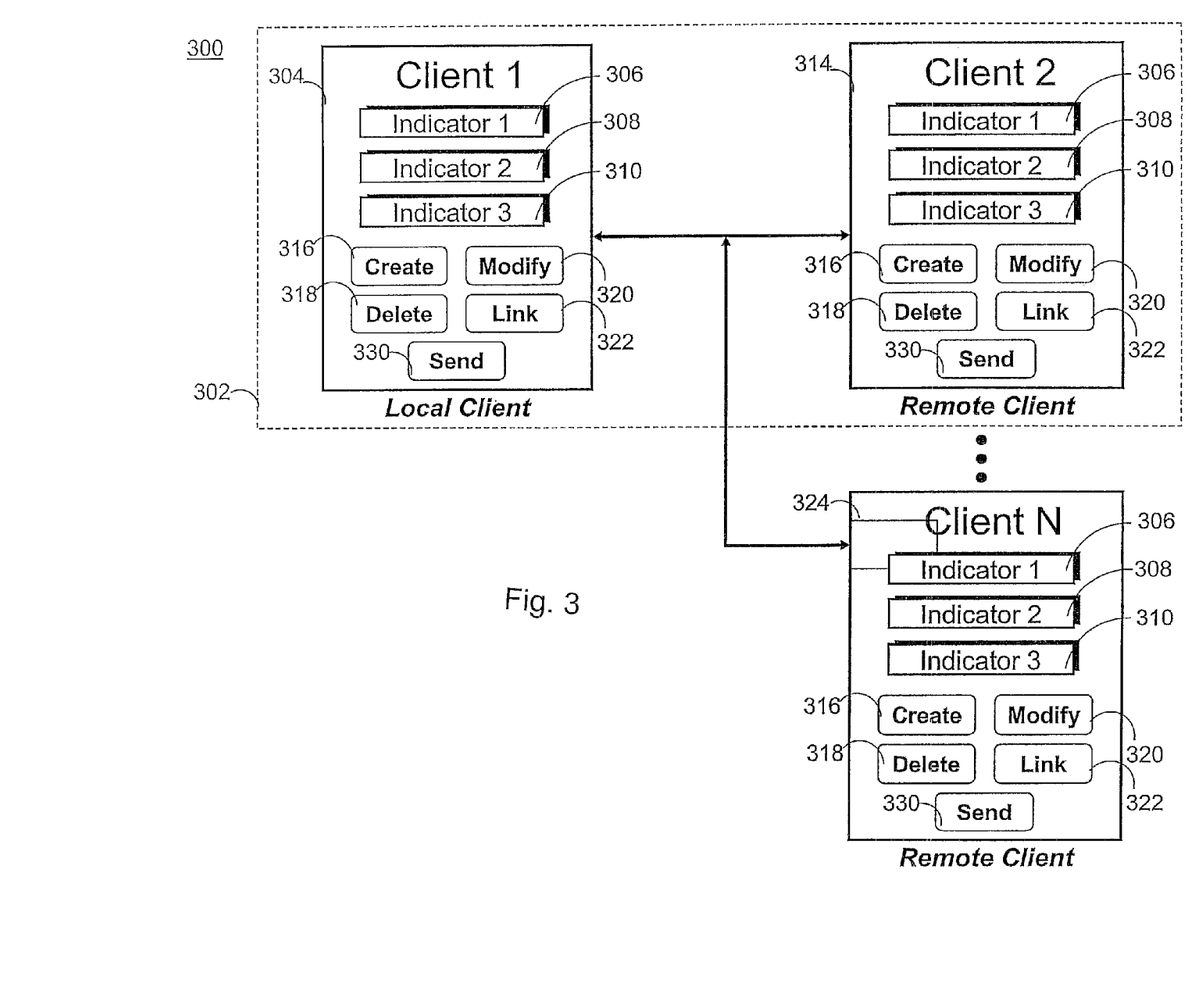
FIG. 3 is a block diagram illustrating a multiple client community in accordance with one embodiment of the present invention.
Figure 4:
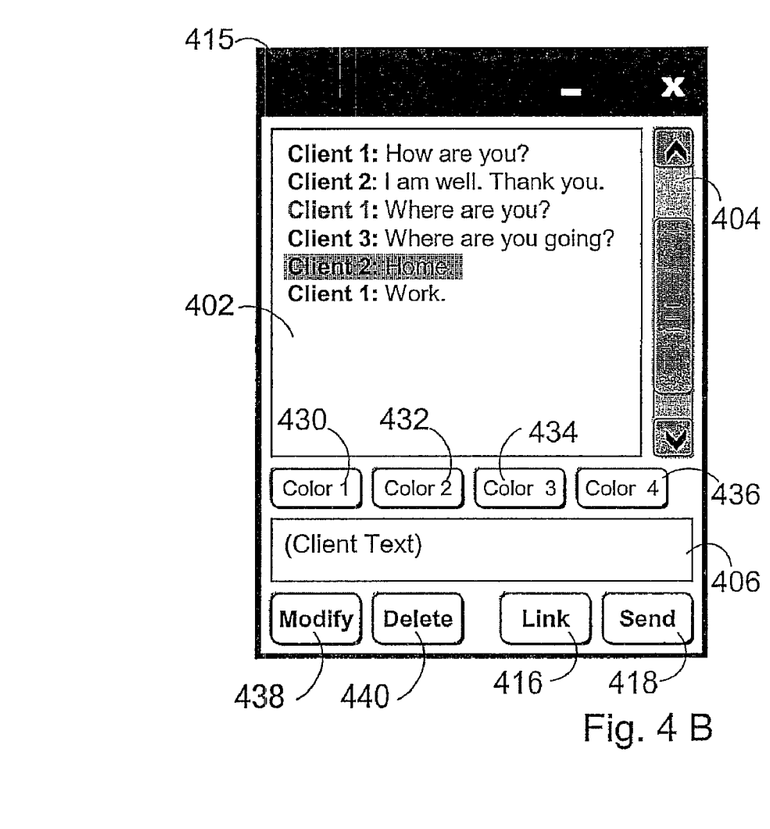
FIG. 4A illustrates a graphical user interface for linking messages within a messaging interface via line indicators, according to one embodiment of the invention.
FIG. 4B illustrates a graphical user interface for linking messages via color indicators, according to one embodiment of the invention.
FIG. 4C illustrates a graphical user interface for creating, modifying, and deleting message indicators, according to one embodiment of the invention.
FIG. 4D illustrates a graphical user interface for linking messages via "client" indicators, according to one embodiment of the invention.

FIG. 3 illustrates an example synchronous collaborative environment 300 according to an embodiment of the invention in which a local client sends messages to and receives messages from one or more remote clients. Client interfaces include local client, client1 304, and remote clients, client2 314, and clientN 324 (where N represents any integer number greater than 2). Ideally, there is no limit to the number of remote clients allowed to communicate in synchronous collaborative environment 304, as represented by ClientN 324. However, in an alternate embodiment, there may be only one local and one remote instant messaging client, as depicted in environment 302.

Each client interface (304, 314, 324) include affordances to select one of a plurality of available message linking indicators (e.g., indicators 306, 308, and 310), as well as affordances (316, 318, 320, and 322 respectively) to create, delete, modify, and link the selected message indicators (306, 308, and 310) to two or more messages. When engaged/selected, these trigger/initiate the underlying function defined by the name of the affordance. The affordances represent options and functions (collectively referred to as affordances, hereinafter) and are provided via visual buttons, menu items, etc., within the interface. Client interfaces 304, 314, and 324 also include send affordance 330, enabled when a user selects the affordance with an input device (such as a pointing device). When selected, send affordance 330 enables messaging application to post a message to each client (304, 314, and 324) in synchronous collaborative environment 300.

In one embodiment, message-linking indicators (306, 308, and 310) are chosen from an existing menu of indicators. Client interfaces 304, 314, and 324 of synchronous collaborative environment 300, display message linking indicators 306, 308, and 310. Each indicator (306, 308, and 310) represents the functionality of linking messages utilizing the indicator selected by the user. These indicators (306, 308, and 310) may enable a user to link multiple messages by color-coding, italicizing, bolding, or text font type. Also, indicators (306, 308, and 310) may also enable a user to link messages with line connectors. Three indicators are represented in synchronous collaborative environment 300. However, any number of indicators may be provided depending on implementation.

In one embodiment, indicators may be created or modified utilizing create affordance 316 and modify affordance 320, respectively, in client interface (304, 314, or 324). Create affordance 316 allows the client to design a new indicator utilizing an indicator palette (see FIG. 4C). The indicator palette is displayed when create affordance 316 is engaged by the user. The user may choose the color, font type, line connector, or illustration of choice to identify contextual connection of messages. Once the indicator link has been created, the user may engage the created indicator by selecting link affordance 322, which activates the background function for linking specific messages. In another embodiment, the user may modify an existing linking indicator by selecting the indicator to modify then selecting modify affordance 320, which displays the indicator palette (415). The user may modify the indicator then utilize the modified indicator by selecting link affordance 322. Each of the functions in synchronous collaborative environment 300 may be assigned before or after message submission, removed from the software application, or otherwise adjusted, as described hereafter. Thus, link affordance 322 may be engaged before or after selection of the message(s) to link.

In another embodiment, delete affordance 318 may be utilized to disengage an existing link. Delete affordance 318 is typically utilized when a user has mistakenly connected a message(s) or modified a response to a linked message. Delete affordance 318 may be utilized before or after a message has been sent by selecting the target message or indicator for link deletion then engaging/selecting delete affordance 318.

In an example embodiment, a user enters the synchronous collaborative community via a computer system. The user is presented with messaging interface 400, which includes entry fields generated for sending/receiving information to/from the messaging server. FIGS. 4A, 4B, 4C, and 4D illustrate example embodiments of the messaging interface (400, 415, 425, and 435).

In one embodiment, messaging interface 435 of FIG. 4A comprises message display 402, message scroll bar 404, client text entry field 406, link affordance 416, and send affordance 418. In the current embodiment, lines are utilized to identify a link between two or more messages from one or more users. Link affordance 416 may be selected before or after the message(s) have been identified. In the example embodiment of FIG. 4A, two clients exchange messages that are displayed within message interface 435. Based on user selections/inputs to associate various client2 responses with specific client1 queries (messages), MLI utility 140 displays lines 403 and 405 between selected messages, visually linking client2 responses to specific client1 queries. Lines 403 or 405 are illustrated configured with different dashes, weights, colors, and end points. When send affordance 418 is engaged, the message is sent to the message server and distributed to each client in the synchronous collaborative instant messaging environment.

In another embodiment, messaging interface 415 of FIG. 4B comprises message display 402, message scroll bar 404, client text entry field 406, link affordance 416, send affordance 418, and color indicator affordances 430, 432, 434, and 436. FIG. 4B also includes modify and delete affordances 438 and 440. In the example embodiment, FIG. 4B illustrates two messages linked by color, represented by shading of the linked messages. Each received message may be color-coded per text, client, or message, as assigned by the user. The different colored messages are then displayed to every user (clients 1, 2, and 3) in the synchronous collaborative environment. Modify and delete affordance 438 and 440 enable the user to modify the color selection or delete an existing color linkage. Modify affordance 438 enables changing of the color assigned to a selected indicator and/or changing the specific assignment of the indicator (i.e. link text, message, client, etc.). Delete affordance 440 detaches a message link and/or removes color from the link. Link affordance 416 controls the ability to contextually link messages before or after sending the message. When engaged, send affordance 418 posts messages to the messaging server to be distributed in the synchronous collaborative or instant messaging environment.

In another illustrative embodiment, messaging interface 425 of FIG. 4C comprises message display 402, message scroll bar 404, client text entry field 406, link affordance 416, send affordance 418, modify affordance 438, delete affordance 440, and create affordance 460. Link affordance 416 controls the ability to contextually link messages before or after sending the message. When engaged, send affordance 418 posts messages to the messaging server to be distributed in the synchronous collaborative or instant messaging environment. Example text is provided at message display 402. According to the current embodiment, the indicators are provided via indicator palette 415. In the example embodiment of FIG. 4C, linked messages are represented by italicized format and bold font format. Other indicators are illustrated within indicator palette 415, including line connectors, line terminators, color, and a selection of icons. This list of illustrated indicators is not meant to be exhaustive of the various types of indicators that may be provided within different implementations of the invention.

Selection of create affordance 460 or modify affordance 438, triggers a display of indicator palette 415. The user may utilize an existing indicator, select modify affordance 438 to change an existing indicator, or select create affordance 460 to create a new indicator. The user may provide a linked response to a specific message by first selecting the message, client name, or text of choice followed by a selection of an indicator from within indicator palette 415 prior to message submission. MLI utility 140 can be configured to require selection of link affordance 416 prior to message submission, or link the message directly upon selection of text, message, or client name.

In another embodiment, messaging interface 400 of FIG. 4D comprises message display 402, message scroll bar 404, client text entry field 406, link affordance 416, send affordance 418, and client indicator linking affordances 408, 410, 412, and 414. Link affordance 416 controls the ability to contextually link messages before or after sending the message. When engaged, send button 418 posts messages to the messaging server to be distributed in the synchronous collaborative or instant messaging environment. Example text is provided at message display 402. The client may contextually indicate response to a specific client's message by selecting any one of indicator linking affordances 408, 410, 412, and/or 414, before or after the message is sent. MLI utility 140 may be configured to require selection of link affordance 416 prior to submission, or link the message directly upon selection of indicator linking affordances 408, 410, 412, and/or 414. In the example embodiment of FIG. 4D, client messages are italicized to represent message linking. Client indicator linking affordances 408 and 414 are shaded to denote engagement of linking between messages of clients 1 and 4.

In each of the above embodiments, MLI utility 140 may be configured to allow each client in the synchronous collaborative environment to display indicator linking in real time, or the clients may only display the linked message following engagement of send affordance 418. There are no limitations to the number of clients or indicators utilized in any embodiment of this invention.

Figure 5:
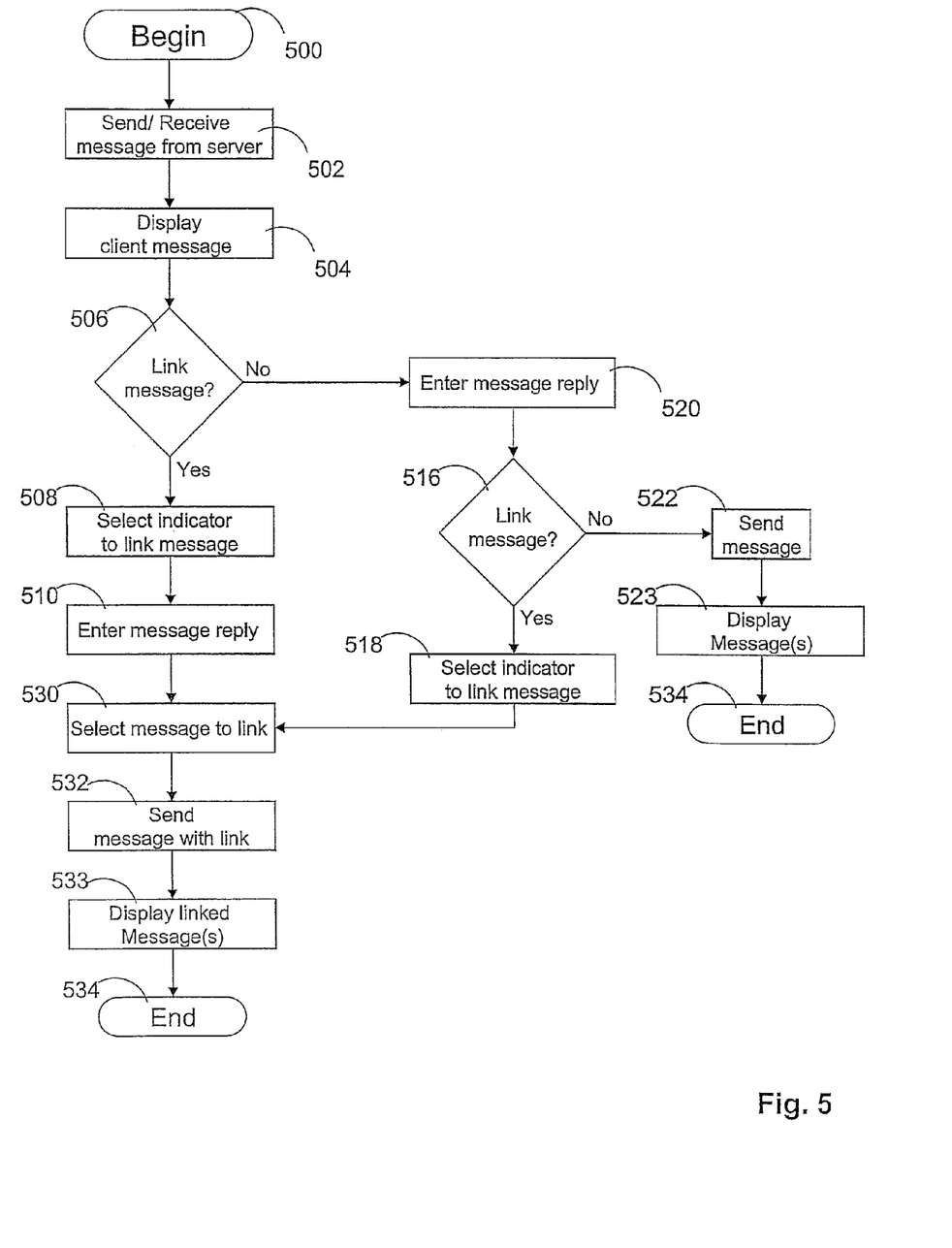
FIG. 5 is a logic flow chart illustrating the processing of a synchronous collaborative application enhanced with a message linking indicator (MLI) utility in accordance with one embodiment of the present invention.

C. Sending and Receiving Linked Messages in a Synchronous Collaborative Environment FIG. 5 illustrates a process by which a messaging application enhanced with MLI utility generates messages and links messages in a synchronous collaborative environment. For simplicity in describing the illustrative process, all functions related to both messaging application and MLI utility 140 are described as though provided/completed by messaging application. Functions directly provided by MLI utility 140 are also specifically described, where appropriate. MLI utility 140 enables the messaging application to post new messages linked to previous messages and to link existing messages, clients, or users within the messaging interface. Messaging application is assumed to provide a set of selectable indicators (see FIG. 3) that may be selected to link to specific messages within the messaging environment.

The process of FIG. 5 begins at step 500, and proceeds to step 502, which illustrates messaging application receiving a message (generated by another client/user) from messaging server. Following receipt of a message, the messaging application displays the message in the messaging interface display box, as shown in step 504. MLI utility 140 monitors for selection of an indicator and/or a link affordance within messaging application, as provided at step 506. This monitoring is actually a continuous, open option to link a response to a previous message or client prior to or following generation of the response. At step 520, assuming neither the indicator and/or link affordance is selected prior to entry of a response, messaging application detects entry of the response (i.e., a message) within text field of the messaging interface. MLI utility 140 continues to monitor for selection of the indicator and/or link affordance to link the message to a previous message, as shown at block 516. If no indicator or the link affordance is selected, the messaging application detects selection of the send affordance at step 522, and messaging application posts the message for display without any linking information, as shown at step 523. When send affordance is selected, the message is transmitted to the messaging server, and the messages are displayed on each client's messaging interface. The process then ends at step 524 with normal message display (i.e., no linking indicators associated with the messages). In one embodiment, MLI utility 140 continues to allow the user to link the message even after the message is posted. If the link affordance is never selected to activate the linking function, the message linking processes of MLI utility 140 are not triggered.

In the flow chart of FIG. 5, the link function may be initiated at steps 506 or 516, either before or after the message is generated. Returning to step 506, assuming the link affordance is selected, MLI utility 140 immediately provides a selection of possible indicators for use in completing the link, and enables selected by the user of the specific indicator, as shown at step 508. With the indicator selected, messaging application monitors for entry of a message reply within the text field of messaging interface, at step 510. Similarly, if the link function is activated/detected at step 516, the mechanisms for selecting the indicator of choice is activated at step 518, and user selections are received and the indicator identified and associated with the specific message(s).

MLI utility 140 then monitors for selection of a previous message to link to the present message, at step 530. Once the link function is engaged at step 530 and messaging application detects selection of the send affordance to trigger the send function, messaging application sends the new message along with the linking information, as shown at step 532. The message is transmitted to the messaging server, and the message posted to the messaging interfaces within the collaborative environment. At step 533, the message is displayed along with the linking data to the other/previous message(s) on each client's messaging interface. The process then ends at step 534 with the messages displayed with selected linking indicator(s) identifying linked messages.

Figure 6:
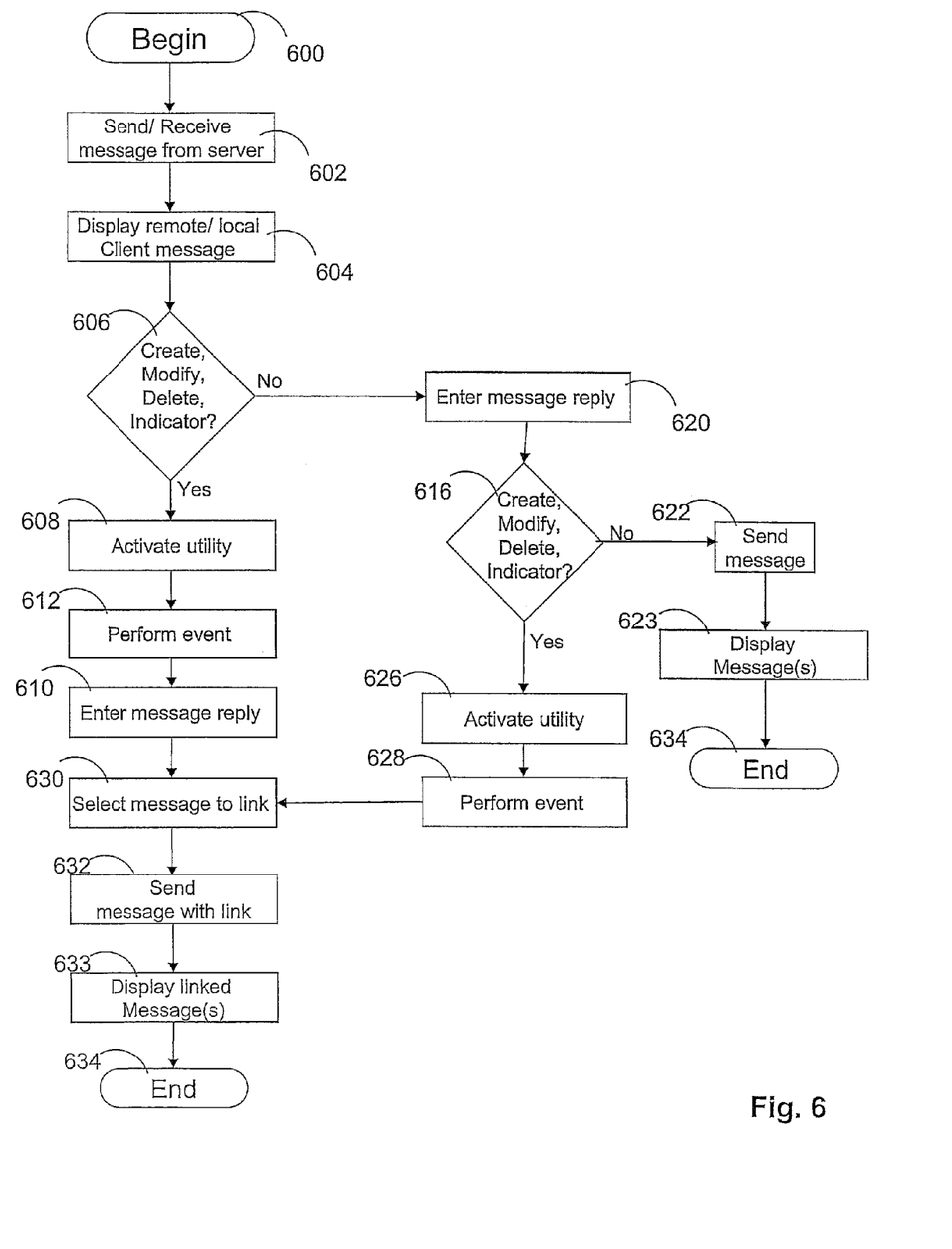
FIG. 6 is a logic flow chart illustrating the processing of a synchronous collaborative application enhanced with the MLI utility in accordance with a second embodiment of the present invention.

The flow chart of FIG. 6, illustrates another embodiment of the invention. Specifically, FIG. 6 illustrates a process for sending and receiving linked messages in a synchronous collaborative environment is described. In FIG. 6, the MLI utility presents affordances within the messaging interface to initiate the following functions: create, modify, or delete indicators linked to a message. The contextual indicator functions: create, modify, and delete and their corresponding affordances are previously described (see FIGS. 4B and 4C descriptions above).

The process begins at step 600, and proceeds to step 602, which illustrates the messaging application (executing on a first client) receiving a message from another user/client, perhaps via messaging server. Following receipt of the message, the message is displayed within the messaging interface, as shown in step 604. MLI utility monitors for selection of one of the available linking affordances (create, modify, delete) as shown at step 606. As with FIG. 5, this monitoring may occur before entry of the message, during or after entry of the message, as provided by second decision step 616. Thus, entry of the message is shown as being detected both at step 620 and step 610. Each monitoring for a selection of a linking affordance (steps 606 and 616) are followed by activation of MLI utility 608 and 626 when the selection occurs (i.e., selection of a linking affordance is detected by messaging application). Once MLI utility is activated, MLI utility provides certain pre-programmed options/selections/functions, which complete the specific function associated with the selected linking affordance, as shown at steps 612 and 628. In the flow chart of FIG. 6, the functions for contextual indicators create, modify, and delete may be initiated at steps 606 or 616. MLI utility 140 may initiate create, modify, or delete functions. Also, MLI utility 140 may perform message-linking functions before or after message submission.

If at steps 606 and 616, the messaging application does not receive/detect selection of a linking affordance, and a message is entered at step 620, messaging application determines at step 622 whether selection of a send affordance. If the send affordance has been selected, messaging application initiates the send function, which sends the message to the messaging server at step 623. Messaging utility also posts/displays the message on the messaging interface for each client within the collaborative environment, at step 623. The process ends at step 624 with the messages displayed without any linking information.

Turning now to step 630, once the selected function's event is performed at steps 628 and 612 and a new message has been entered (steps 620 or 610), the messaging application monitors for selection of an existing message to link to the new message, at step 630. Once the link function is initiated at step 630, the MLI utility monitors for detection of a selection of the send affordance, which triggers the send function. With the send function triggered, the new message is transmitted to the messaging server (or other client interfaces) with the selected link, as shown at step 632. The message(s) is transmitted to the messaging server, and the messages are displayed along with the link indicator on each messaging interface within the collaborative environment, as indicated at step 633. The process ends at step 634 with the new message displayed along with the indicator linking the other message(s) to which the new message is linked.

D. Structured Archiving and Retrieval of Contextually-Linked Messages

Another aspect of the invention involves the extension of the message linking feature to enable selective creation and subsequent manipulation or retrieval of a message thread (or tree). When the various clients perform the linking feature with several messages, the set of linked messages are considered a single thread. The thread may be a single branch thread or a parallel branch thread. That is, the various users may link messages/responses to an original message posting of the thread (which creates parallel branches) or the users may link messages in sequence to other previous responses that are linked to the original message posting (which creates a single branch). The thread may include parallel branches, one or more of which then supports its own single branch or set of parallel branches.

The functionality of this embodiment is applicable to an environment where users are able to contextually link messages. For example, one embodiment enables the user to click (right click) on a particular message and, in response, receive an interface or drop-down menu option to display the entire tree structure of messages that are linked through the particular message. Another embodiment enables access to the contextually-linked messages as a saved message sequence that is accessible for off-line display. The off-line display is available at some time after the messaging between users has completed and the links established. Optionally, the display may also be enabled during an ongoing session, where the display is provided in a separate window/interface in response to a particular user entry. The use of context-based linking of messages provides user-desired enhancements to the traditional methodology of providing chronological ordering of messages, which traditional methodology does not account for the contextual appropriateness of messages.

Figure 7:
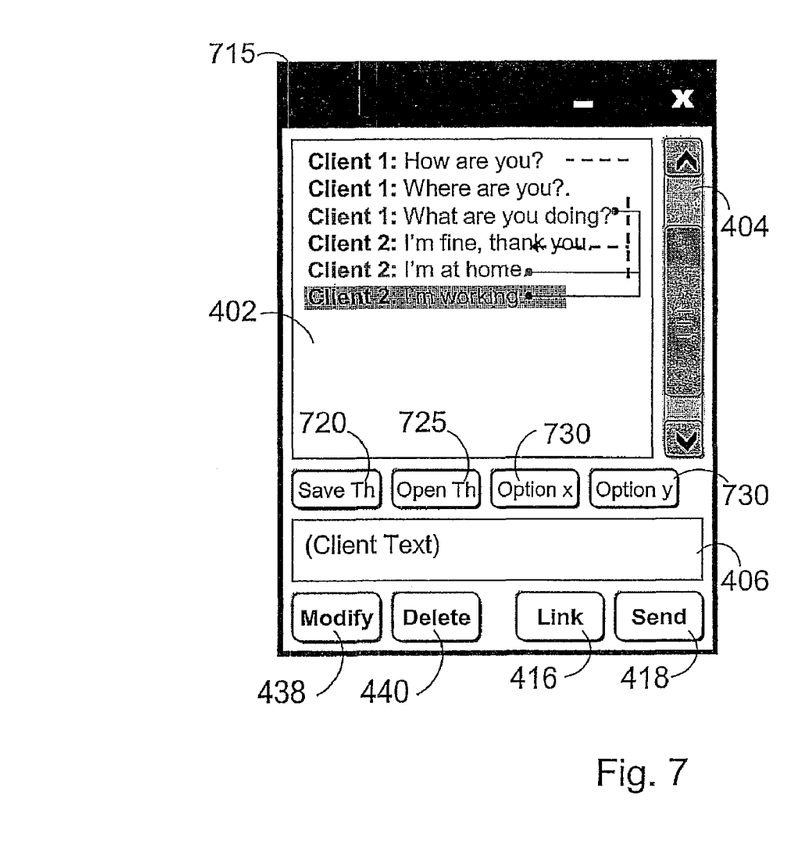
FIG. 7 illustrates a graphical user interface with options for archiving and retrieving linked messages, according to one embodiment of the invention.

FIG. 7 illustrates an example messaging interface in which selectable options are provided to enable archiving of a thread from within the messaging environment. As shown, messaging interface 715 comprises save option 720 by which messages linked by a current/selected thread may be save. Messaging interface 715 also comprises "view full thread" or "open thread" option 725 which enables the thread to be opened in a secondary or child window. Other thread-associated options, illustrated as Options x and y 730 may also be provided within messaging interface 715. Notably, messages within the message thread are those messages that have been linked from among the complete list of messages within the original collaborative window, and the linking of messages may be out of sequential order. One embodiment of the invention enables message retrieval in an orderly fashion when derived from contextually-linked messages in a synchronous collaborative environment.

Figure 8:
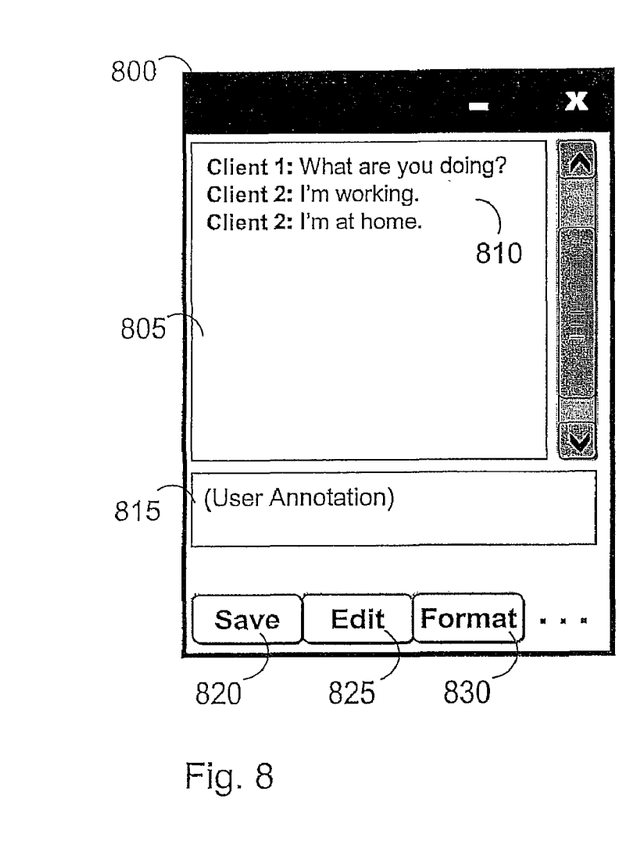
FIG. 8 illustrates an example child window within which a linked message thread may be opened and manipulated, according to one embodiment of the invention.

FIG. 8 illustrates an example child window within which the selected (or saved) message thread may be re-displayed and made available for user manipulation. As shown, child window 800 includes display area 805 within which message thread 810 is displayed having several associated messages. Display of message thread 810 within child window 800 may be independent of the selection of messages to link/associate with the thread (using messaging interface 715, for example). Thus, in a first implementation, child window 800 is opened via selection of open option 725 within messaging interface 715 while message thread 810 is selected/highlighted. Alternatively, in a second implementation, child window 800 may be opened when a previously-stored message thread 810 is selected and opened from memory. Child window 800 also comprises user annotation entry area 815, within which a user may enter additional content which is added to the thread in a location selected by the user.

As shown, child window 800 also includes a series of user selectable options (820-830) for manipulation of portions of the message thread 810. For example, within child window 800, the user is provided save option 820, which saves the linked messages (message thread) as a single file with an assigned filename and file attributes, such as a date of creation, which may be later modified/changed. Other options may include format option 830 by which the user is able to change the display of the linked messages when opened within the child window 800. Also illustrated is edit option 825 which enables user editing of the content, layout, and sequence of the messages within the thread.

One embodiment utilizes contextual indicators within a synchronous collaborative (chat) application to re-display messages in a linked structure, whose sequence of message presentation may be different from a chronologically sequence. For example, in one embodiment, a nested linking of messages may be utilized (e.g., 1, 1.1, 1.2, 1.2.1, 1.2.2 . . . ). One advantage over the traditional chronological method used is that the methods of the present embodiment enable a user to view only selected/relevant messages (from a larger sequence of messages), without having to weed through the other non-relevant messages each time.

According to the embodiment, the user is enabled to save only the relevant portions of the message/chat transcript, which may then be later utilized for post-chat or offline review. This feature allows the utility to remove all other messages not linked to the message thread and display only the linked messages. The display of only the linked messages may be in a thread-format. With this thread separated from the other messages posted during the messaging session, the user is then able to save only the message thread within messages that the user wants saved and in a format that links the various responses to the appropriate messages. Additionally, in one embodiment, the utility enables the stored message thread (transcript) to be sorted by either chronological time and/or by time & thread. In one embodiment, the utility may automatically save the transcripts of linked messages via an auto-save function.

Figure 9:
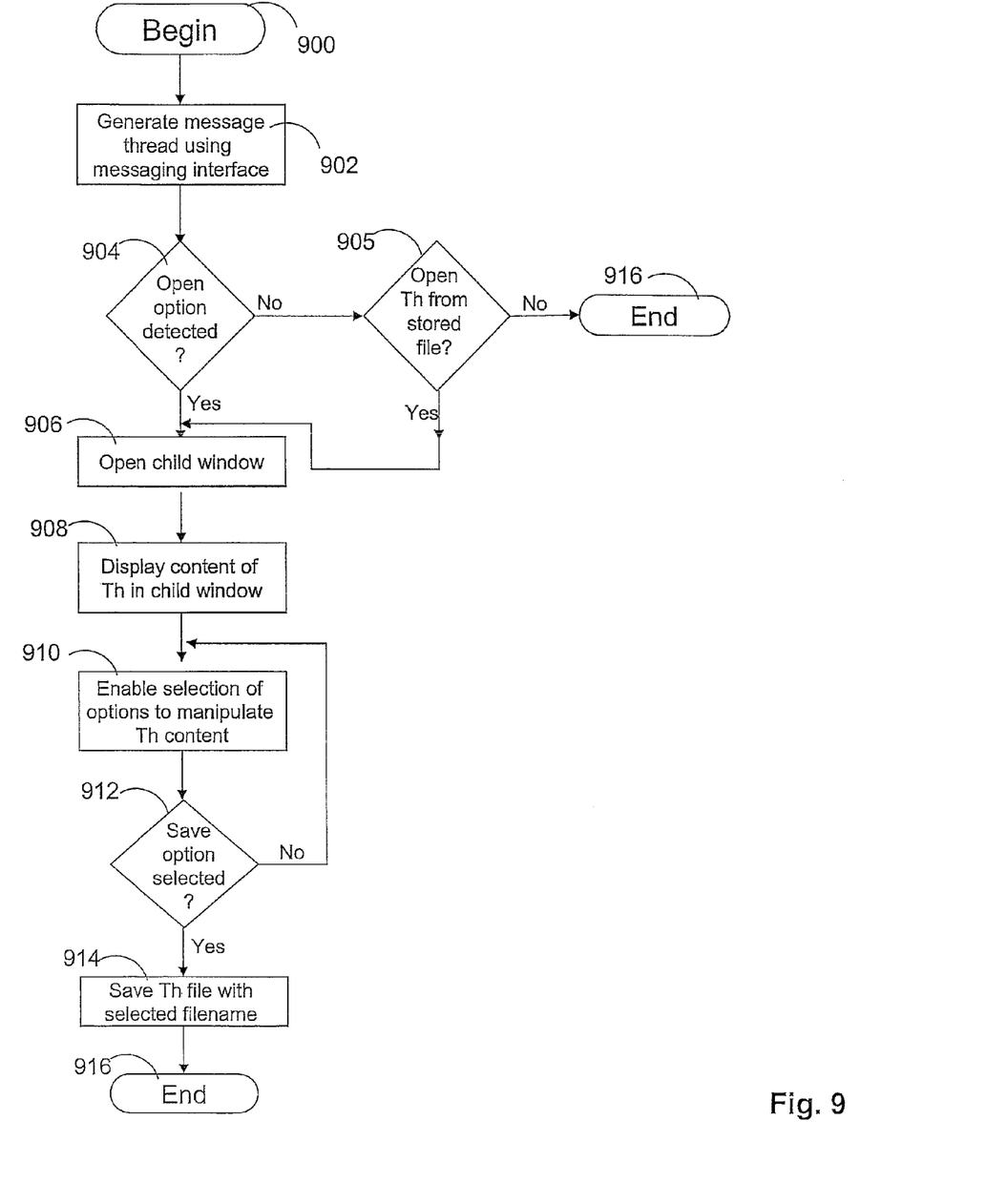
FIG. 9 is a logic flow chart illustrating the processing of a archiving and retrieving linked messages as message threads, in accordance with one embodiment of the present invention.

With reference now to FIG. 9, wherein is illustrated a flow chart by which the method of the present embodiment may be implemented using the messaging interface 715 of FIG. 7 and child window 800 of FIG. 8. The method begins at block 902 which illustrates a message thread being established, using features available within a messaging interface. Once a message thread is established, a user may highlight/select the thread (by right-clicking on a message within the linked messages, for example) and then select "view full thread" or "open thread" option (725). The MLI utility determines at block 904 whether the "view full thread" or "open thread" option is selected. When selection of the "view full thread" or "open thread" option is detected, while a message thread is highlighted/selected, the utility opens a child window (800), as shown at block 906. The utility then displays the messages associated with the message thread within the child window, as shown at block 908. From the child window, the utility provides the user with options for manipulating the message thread, including changing the sequence of presentation of linked messages, and other forms of contextual as well as format-based manipulation, as shown at block 910. A determination is also made at block 912 whether selection of a save option is detected. If the save option is detected, a file save window is provided in which the filename and location are entered and/or selected by the user, as depicted at block 914. The process then ends, as shown at termination block 916.

Returning to block 904, if the opening of the child window is not initiated from the messaging interface, a next determination is made at block 905 whether the message thread is opened via a next method, such as from a directory view or another application. If the message thread is opened via another method, the associated file is opened within the child window (or other window), as shown at block 908. The process then proceeds to block 910.

With the above invention, context is added to messages being exchanged in a messaging environment, such that related messages are visually linked and less confusion exists with regards to the various posted messages. Notably, while the invention is described from the perspective of linking a new message to an existing message, the invention further enables linking of multiple existing messages after the messages are posted. Also, while the invention is describe as linking messages originating from different clients/users, the functionality of the invention also enables a user to link several of the user's messages. This implementation may be applicable to situations in which the user enters a message using multiple postings that are separated by other postings from other users/clients, as an example.

In the flow charts above, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of storage media/devices used to actually carry out the distribution. Examples of such storage media/devices include floppy disks, hard disk drives, and CD ROMs.

While the invention has been particularly shown and described with reference to a preferred embodiment, it will be understood by those skilled in the art that various changes in form and detail may be made therein without departing from the spirit and scope of the invention.

What is claimed is:

1. In a data processing system having a messaging application that provides an instant messaging interface, a method comprising:
    utilizing a display device, the data processing system displaying in the instant messaging interface a plurality of messages including at least one message transmitted by the data processing system to a remote messaging system via a network and at least one message received by the data processing system from the remote messaging system via the network, wherein the displaying includes displaying an initial presentation of the plurality of messages in an initial presentation order in which a second message of the plurality of messages is intermediate first and third messages among the plurality of messages;
    after displaying the initial presentation and in response to receipt of a local user input at the data processing system defining membership of a message thread:
        the data processing system modifying the initial presentation of the plurality of messages by presenting a message linking indicator visually indicating an association of the first and third messages as members of the message thread and excluding the second message from the message thread, wherein, prior to receipt of the local user input, the first and third messages are not associated with the message thread by the data processing system; and
        the data processing system transmitting to the remote messaging system a linking message indicating the association of the first and third messages as members of the message thread.

2. The method of claim 1, wherein:
    the message linking indicator is an indication other than a presentation order of the plurality of messages.

3. The method of claim 2, wherein the message linking indicator includes a non-textual graphical element extending between the first and third messages.

4. The method of claim 2, wherein the message linking indicator includes a common attribute applied to textual content within the first and third messages.

5. The method of claim 1, further comprising:
    saving the message thread as a file in response to selection of a save option while at least one message in the message thread is selected, said file having a filename and file attributes, including a date of creation.

6. The method of claim 5, further comprising:
    in response to opening of the file, automatically presenting the message thread with the display device within a window that enables manipulation of the message thread provided by the file; and
    displaying the message linking indicator in the window.

7. The method of claim 1, wherein said method further comprises:
    detecting a selection of an option within the instant messaging interface to open a new window while said message thread is selected; and
    in response to detecting the selection of the option, the data processing system automatically opening the new window and displaying the message thread within the new window utilizing the display device.

8. The method of claim 1, the method further comprising one or more of:
    re-arranging a presentation order in the instant messaging interface of messages within the message thread;
    sorting the messages within the message thread; and
    changing a filename of a file in which the message thread is stored.

9. The method of claim 1, the method further comprising one or more of:
    deleting one or more messages within the message thread from the instant messaging interface;
    editing one or more messages within the message thread; and
    annotating the message thread with additional information.

10. The method of claim 1, wherein:
    the message thread is a first message thread; and
    the method further comprises:
        after the displaying the initial presentation and in response to receipt by the data processing system from the remote messaging system of a linking message indicating association of fourth and fifth messages among the plurality of messages as members of a second message thread, the data processing system modifying display of the plurality of messages from the initial presentation by presenting a message linking indicator visually indicating an association of the fourth and fifth messages as members of the second message thread.

11. The method of claim 10, wherein said modifying display of the plurality of messages from the initial presentation includes performing the modifying only in response to a determination that modification of the display does not conflict with an association of one of the fourth and fifth messages with a different message thread established by local user input at the data processing system.

12. A data processing system, comprising:
    a processor;
    a display device;
    a network interface device, coupled to the processor, which the device communicates with a remote messaging system; and
    data storage coupled to the processor, wherein the data storage includes program code executable on the processor to present an instant messaging interface in the display device through which messages can be received from the remote messaging system and locally composed on the device, wherein the program code is configured to:

utilizing a display device, display in the instant messaging interface a plurality of messages including at least one message transmitted by the data processing system to a remote messaging system via a network and at least one message received by the data processing system from the remote messaging system via the network, wherein the plurality of messages are initially presented in an initial presentation order in which a second message of the plurality of messages is intermediate first and third messages among the plurality of messages;

after display of the plurality of messages in the initial presentation order and in response to receipt of a local user input at the data processing system defining membership of a message thread:

modify the initial presentation of the plurality of messages by presenting a message linking indicator visually indicating an association of the first and third messages as members of the message thread and excluding the second message from the message thread, wherein, prior to receipt of the local user input, the first and third messages are not associated with the message thread by the data processing system; and         transmit to the remote messaging system a linking message indicating the association of the first and third messages as members of the message thread.

13. The data processing system of claim 12, wherein said program code is further configured to:

save the message thread as a file in response to selection of a save option while at least one message in the message thread is selected, said file having a filename and file attributes, including a date of creation;

in response to opening of the file, automatically present the message thread with the display device within a window that enables manipulation of the message thread provided by the file; and     display the message linking indicator in the window.

14. The data processing system of claim 12, wherein said program code is further configured to:

detect a selection of a option within the instant messaging interface to open a new window while said message thread is selected; and     in response to detecting the selection of the option, automatically open the new window and display the message thread within the new window.

15. The data processing system of claim 12, wherein the program code is further configured to:

re-arrange a presentation order in the instant messaging interface of messages within the message thread;

sort the messages within the message thread; and change a filename of a file in which the message thread is stored.

16. The data processing system of claim 12, wherein the program code is further configured to:

delete one or more messages within the message thread from the instant messaging interface;

edit one or more messages within the message thread; and     annotate the message thread with additional information.

17. The data processing system of claim 12, wherein:

the message thread is a first message thread; and the program code is further configured to:

after the displaying the initial presentation and in response to receipt by the data processing system from the remote messaging system of a linking message indicating association of fourth and fifth messages among the plurality of messages as members of a second message thread, modify display of the plurality of messages from the initial presentation by presenting a message linking indicator visually indicating an association of the fourth and fifth messages as members of the second message thread.

18. The data processing system of claim 17, wherein the program code is configured to modify display of the plurality of messages from the initial presentation by presenting a message linking indicator visually indicating an association of the fourth and fifth messages as members of the second message thread only in response to a determination that modification of the display does not conflict with an association of one of the fourth and fifth messages with a different message thread established by local user input at the data processing system.

19. The data processing system of claim 12, wherein the message linking indicator includes a non-textual graphical element extending between the first and third messages.

20. The data processing system of claim 12, wherein the message linking indicator includes a common attribute applied to textual content within the first and third messages.

21. A computer program product, comprising:

a non-transitory tangible computer-readable storage device; and     program code, stored on the tangible computer-readable storage device, that when executed by a processor causes a data processing system to:

utilizing a display device, display in the instant messaging interface a plurality of messages including at least one message transmitted by the data processing system to a remote messaging system via a network and at least one message received by the data processing system from the remote messaging system via the network, wherein the plurality of messages are initially presented in an initial presentation order in which a second message of the plurality of messages is intermediate first and third messages among the plurality of messages;

after display of the plurality of messages in the initial presentation order and in response to receipt of a local user input at the data processing system defining membership of a message thread:

modify the initial presentation of the plurality of messages by presenting a message linking indicator visually indicating an association of the first and third messages as members of the message thread and excluding the second message from the message thread, wherein, prior to receipt of the local user input, the first and third messages are not associated with the message thread by the data processing system; and         transmit to the remote messaging system a linking message indicating the association of the first and third messages as members of the message thread.

22. The computer program product of claim 21, wherein:

the message linking indicator is an indication other than a presentation order of the selected ones of the plurality of messages.

23. The computer program product of claim 22, wherein the message linking indicator includes a non-textual graphical element extending between the first and third messages.

24. The computer program product of claim 22, wherein the message linking indicator includes a common attribute applied to textual content within the first and third messages.

25. The computer program product of claim 21, wherein the program code is further configured to:
- save the message thread as a file in response to selection of a save option while at least one message in the message thread is selected, said file having a with a filename and file attributes, including a date of creation;
- in response to opening of the file, automatically present the message thread within a window that enables manipulation of the message thread provided by the file; and
- display the message linking indicator in the window.

26. The computer program product of claim 21, wherein said program code is further configured to:
- detect a selection of an option within the instant messaging interface to open a new window while said message thread is selected; and
- in response to detecting the selection of the option, automatically open the new window and display the message thread within the new window.

27. The computer program product of claim 21, wherein said program code is further configured to:
- re-arrange a presentation order in the instant messaging interface of messages within the message thread;
- sort the messages within the message thread;
- change a filename of a file in which the message thread is stored;
- delete one or more messages within the message thread from the instant messaging interface;
- edit one or more messages within the message thread; and
- annotate the message thread with additional information.

28. The computer program product of claim 21, wherein:
- the message thread is a first message thread; and
- the program code is further configured to:
  - after the displaying the initial presentation and in response to receipt by the data processing system from the remote messaging system of a linking message indicating association of fourth and fifth messages among the plurality of messages as members of a second message thread, modify display of the plurality of messages from the initial presentation by presenting a message linking indicator visually indicating an association of the fourth and fifth messages as members of the second message thread.

29. The computer program product of claim 28, wherein the program code is configured to modify display of the plurality of messages from the initial presentation by presenting a message linking indicator visually indicating an association of the fourth and fifth messages as members of the second message thread only in response to a determination that modification of the display does not conflict with an association of one of the fourth and fifth messages with a different message thread established by local user input at the data processing system.

* * * * *